United States Patent
Sakamoto

(10) Patent No.: US 6,793,295 B2
(45) Date of Patent: Sep. 21, 2004

(54) BRAKE CONTROL METHOD AND BRAKE CONTROL APPARATUS FOR MOTORCYCLE

(75) Inventor: Tadashige Sakamoto, Yokosuka (JP)

(73) Assignee: Bosch Braking Systems Co., Ltd., Tokyo (JP)

( * ) Notice: Subject to any disclaimer, the term of this patent is extended or adjusted under 35 U.S.C. 154(b) by 0 days.

(21) Appl. No.: 10/197,167

(22) Filed: Jul. 16, 2002

(65) Prior Publication Data

US 2003/0015916 A1 Jan. 23, 2003

(30) Foreign Application Priority Data

Jul. 19, 2001 (JP) .......................... 2001-220504

(51) Int. Cl.$^7$ .............................................. B60T 13/00
(52) U.S. Cl. ..................................... 303/9.64; 303/9.61
(58) Field of Search ............................. 188/344, 349; 303/9.61, 9.64, 9.75

(56) References Cited

U.S. PATENT DOCUMENTS

| | | | |
|---|---|---|---|
| 5,544,946 A | * 8/1996 | Toyoda et al. | ............ 303/9.64 |
| 5,620,237 A | 4/1997 | Iwashita et al. | |
| 6,273,523 B1 | * 8/2001 | Wakabayashi et al. | ...... 303/9.61 |
| 6,309,029 B1 | 10/2001 | Wakabayashi et al. | |
| 6,390,566 B1 | * 5/2002 | Matsuno | ................. 303/9.64 |
| 6,409,285 B1 | * 6/2002 | Wakabayashi et al. | ...... 303/9.64 |
| 6,557,949 B2 | * 5/2003 | Tani et al. | ................. 303/9.64 |

FOREIGN PATENT DOCUMENTS

| | | |
|---|---|---|
| DE | 19954611 A1 | 5/2000 |
| JP | 71962/2000 | 3/2000 |
| JP | 71963/2000 | 3/2000 |
| WO | WO 02/22417 | 3/2002 |

* cited by examiner

Primary Examiner—Chris Schwartz
(74) Attorney, Agent, or Firm—Carothers and Carothers

(57) ABSTRACT

In a brake control method for a motorcycle which includes a front master cylinder, front wheel cylinders hydraulically connected to the front master cylinder, a rear master cylinder, a rear wheel cylinder hydraulically connected to the rear master cylinder and a hydraulic pressure pump. When only the front master cylinder is operated, brake pressure fluid is supplied to the front wheel cylinders and the fluid pressure pump is driven to supply discharging pressure fluid to the rear wheel cylinder, and when only the rear master cylinder is operated, brake pressure fluid is supplied only to the rear wheel cylinder.

25 Claims, 4 Drawing Sheets

BRAKE CONTROL METHOD AND BRAKE CONTROL APPARATUS FOR MOTORCYCLE

BACKGROUND OF THE INVENTION

1. Field of the Invention

This invention relates to a brake control method for a motorcycle and a brake control apparatus for a motorcycle which includes a front master cylinder, a front wheel cylinder hydraulically connected to the front master cylinder, a rear master cylinder and a rear wheel cylinder hydraulically connected to the rear master cylinder.

2. Description of the Prior Art

For example, in the brake control apparatus for a motorcycle disclosed in the Japanese Patent Official Gazette No. 71962/2000, the front master cylinder is hydraulically connected both to the front wheel cylinder and to the rear wheel cylinder through a normally open electro-magnetic changeover valve. Accordingly, when the front master cylinder is operated, brake fluid is supplied both to the front wheel cylinder and to the rear wheel cylinder. Thus, considerable brake fluid is required from the front master cylinder. Accordingly, the opening of the outlet port of the front master cylinder should be rather large. A large input to the brake hand lever of the front master cylinder is required for applying normal brake force.

In a brake control apparatus for a motorcycle disclosed in Japanese Patent Opening Gazette No. 71963/2000, when only the rear master cylinder is operated, brake fluid is discharged from the front master cylinder with the actuation of the hydraulic pressure pump and it is supplied to the front wheel cylinder. At that time, when the brake hand lever is actuated for operating the front master cylinder, the hand lever stroke becomes shorter than the hand lever stroke at the time when only the front master cylinder is operated, since some brake fluid is already discharged from the front master cylinder. Accordingly, the stroke of the brake lever is variable, and so the lever feeling in the driver's hands is poor, or not so good.

SUMMARY OF THE INVENTION

Accordingly, it is the object of the invention to provide a brake control method for motorcycle and brake control apparatus for motorcycle in which the hand lever feeling when actuating the front master cylinder is always good, and one wheel cylinder connected to one master cylinder is associated or interlockingly actuated with the actuation of the other wheel cylinder connected to the other master cylinder.

In accordance with an aspect of this invention, a brake control method for a motorcycle is provided which includes a front master cylinder, front wheel cylinder means hydraulically connected to said front master cylinder and a rear master cylinder, rear wheel cylinder means hydraulically connected to said rear master cylinder and a hydraulic pressure pump. The improvement resides in the fact that when only said front master cylinder is operated, brake pressure fluid is supplied to said front wheel cylinder means and said fluid pressure pump is driven to supply discharging pressure fluid to said rear wheel cylinder means, and when only said rear master cylinder is operated, brake pressure fluid is supplied only to said rear wheel cylinder means.

In accordance with another aspect of this invention, a brake control method is provided for a motorcycle which includes a front master cylinder, one front wheel cylinder hydraulically connected to said front master cylinder, a rear master cylinder, a rear wheel cylinder hydraulically connected to said rear master cylinder and another front wheel cylinder hydraulically connected to said rear master cylinder and a hydraulic pressure pump. The improvement resides in the fact that when only said front master cylinder is operated, brake pressure fluid is supplied to said one front wheel cylinder and said fluid pressure pump is driven to supply discharging pressure fluid to said rear wheel cylinder, and when only said rear master cylinder is operated, break pressure fluid is supplied to said rear wheel cylinder and said other front wheel cylinder.

In accordance with a further aspect of this invention, a brake control apparatus for a motorcycle is provided which includes a first electro-magnetic changeover valve apparatus connected to a conduit between a front master cylinder and front wheel cylinder means, a second electro-magnetic changeover valve apparatus connected to a conduit between a rear master cylinder and a rear wheel cylinder, hydraulic reservoir means for reserving brake fluid discharged from said front wheel cylinder means and said rear wheel cylinder, and a hydraulic pressure pump the inlet port side of which is connected to said hydraulic reservoir means and the outlet port side of which is connected to said front master cylinder side and said rear wheel cylinder side. The improvement resides in the fact that a first association electro-magnetic changeover valve is arranged between said rear master cylinder and said outlet port side of said hydraulic pressure pump, said first association electro-magnetic changeover valve having normally the communicating state, a second association electro-magnetic changeover valve is arranged between a conduit portion between rear master cylinder and said first association electro-magnetic changeover valve, and the sucking inlet port side of said hydraulic pressure pump; said second association electro-magnetic changeover valve having normally the cutout state. When said front master cylinder is operated, said first association electro-magnetic changeover valve and second association electro-magnetic changeover valve are changed over from the communicating state to the cutout state, and from the cutout state to the communicating state, respectively, and accordingly said hydraulic pressure pump is driven.

In accordance with a still further aspect of the invention, a brake control apparatus for a motorcycle is provided which includes a first electro-magnetic changeover valve apparatus arranged between a front master cylinder and one front wheel cylinder, said first electro-magnetic changeover valve apparatus normally communicating said front master cylinder with said one front wheel cylinder, and cutting off said front wheel cylinder from a front hydraulic reservoir. A second electro-magnetic changeover valve apparatus is arranged between a rear master cylinder and a rear wheel cylinder, said second electro-magnetic changeover valve apparatus normally communicating said rear wheel cylinder with said rear master cylinder, and cutting off said rear wheel cylinder from a rear hydraulic reservoir, and including a hydraulic pressure pump the sucking inlet port side of which is connected to said front and rear hydraulic reservoirs, and the discharging outlet port side of which is connected to said rear master cylinder side and to said front master cylinder.

The improvement resides in the fact that a third electro-magnetic changeover valve apparatus is arranged between said rear master cylinder and another front wheel cylinder different from said one front wheel cylinder, said third electro-magnetic changeover valve apparatus normally communicating said different front wheel cylinder with said rear master cylinder, and cutting off said different front wheel cylinder from said rear hydraulic reservoir. A first association electro-magnetic changeover valve is arranged between said rear master cylinder and the outlet port side of said hydraulic pressure pump and said first association electro-magnetic changeover valve has a normally communicating state. A second associated electro-magnetic changeover valve is connected to a conduit connecting said rear master cylinder and said first associated electro-magnetic changeover valve, with the discharging port side of said hydraulic pressure pump. Said second associated electro-magnetic changeover valve normally has the cutoff state, and when said front master cylinder is operated, said first associated electro-magnetic changeover valve and said second associated electro-magnetic changeover valve are changed over from the communicating state to the cutoff state and from the cutoff state to the communicating state respectively, and said hydraulic pressure pump is driven.

In accordance with a further aspect of the invention, a brake control apparatus for a motorcycle is provided which includes a first electro-magnetic changeover valve apparatus arranged between a front master cylinder and front wheel cylinder means, said first electro-magnetic changeover valve apparatus communicating said front master cylinder with said front wheel cylinder means, and cutting off said front wheel cylinder means from a front hydraulic reservoir. A second electro-magnetic changeover valve apparatus is arranged between said rear master cylinder and said rear wheel cylinder, said second electro-magnetic changeover valve apparatus communicating a rear wheel cylinder with said rear master cylinder, and cutting off said rear wheel cylinder from a rear hydraulic reservoir, and a hydraulic pressure pump is provided with the sucking port side thereof connected to said front and rear hydraulic reservoirs, and the discharging port side of which is connected to said rear master cylinder side and to said front master cylinder side. The improvement resides in the fact that a third electro-magnetic changeover valve apparatus is arranged between said rear master cylinder and another front wheel cylinder different from the one front wheel cylinder, said third electro-magnetic changeover valve apparatus normally cutting off said different front wheel cylinder from said rear master cylinder, and cutting off said different front wheel cylinder from said rear hydraulic reservoir. A first associated electro-magnetic changeover valve is arranged between said rear master cylinder and the discharging port side of said hydraulic pressure pump, said first association electro-magnetic changeover valve having normally the communicating state. A second associated electro-magnetic changeover valve is connected to a conduit connecting said rear master cylinder and said first associated electro-magnetic changeover valve, with the discharging port side of said hydraulic pressure pump, said second association electro-magnetic changeover valve taking normally the cutoff state. When said front master cylinder is operated, said first associated electro-magnetic changeover valve and said association electro-magnetic changeover valve are changed over from the communicating state to the cutoff state and from the cutoff state to the communicating state, respectively and said hydraulic pressure pump means is driven.

The foregoing and other objects, features, and advantages of the present invention will be more readily understood upon consideration of the following detailed description of the preferred embodiments of the invention, taken in conjunction with the accompanying drawings.

DESCRIPTION OF THE PREFERRED EMBODIMENTS

Next, the preferred embodiments of this invention will be described with reference to FIG. 1 to FIG. 4.

Figure 1:
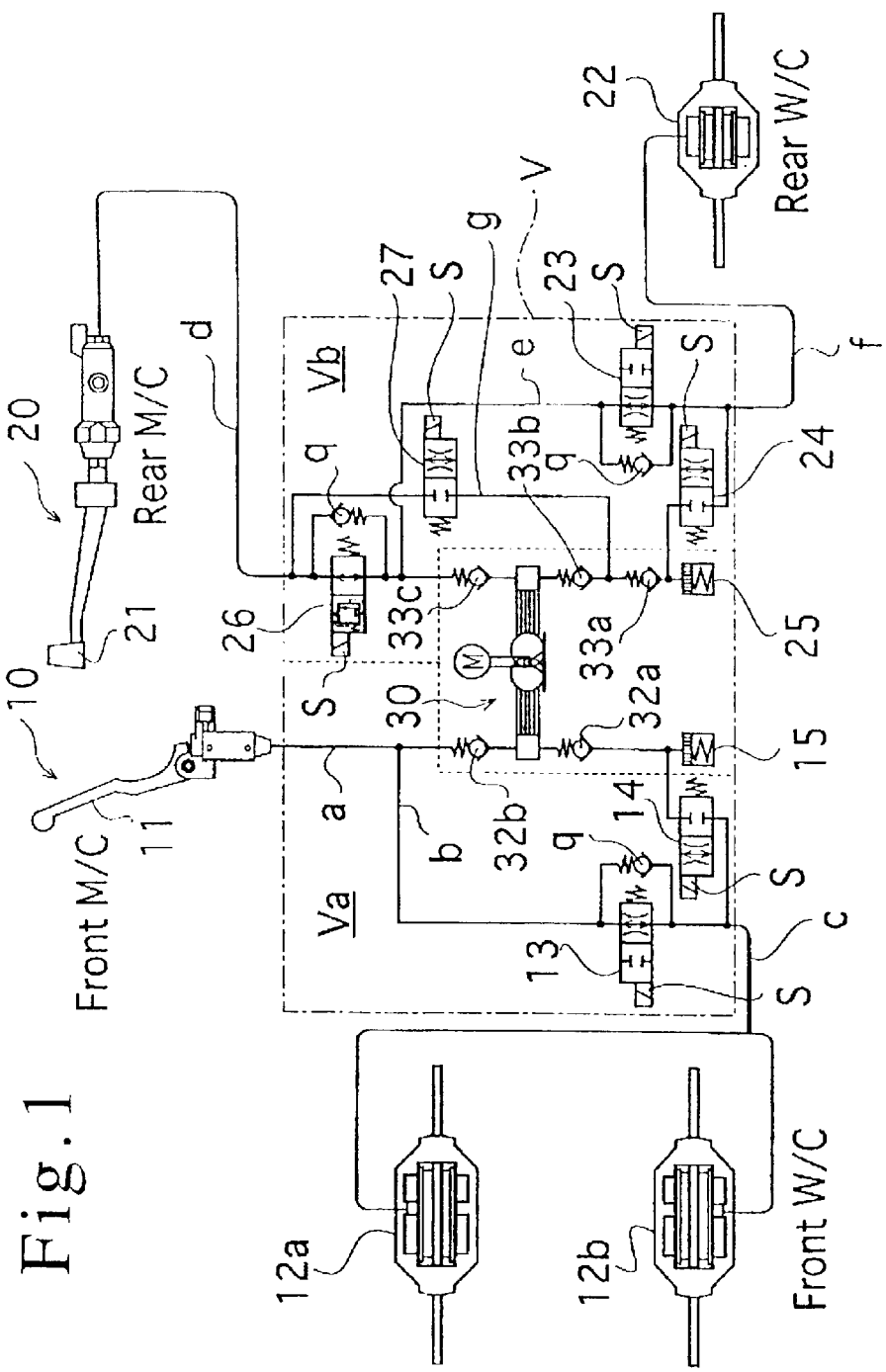
FIG. 1 is a schematic diagram which shows a conduit system of a break fluid pressure control apparatus for a motorbicycle according to a first embodiment of the invention.

As is well known, in FIG. 1 a front master cylinder 10 is operated by hand and a rear master cylinder 20 is operated by foot in a motorbicycle. For operation, [a] hand lever 11 is connected to the front master cylinder 10 and a foot pedal 21 is connected to the rear master cylinder 20. The fluid pressure from the front master cylinder 10 is supplied to a pair of front wheel cylinders 12a and 12b through an electro-magnetic changeover valve apparatus V shown by the dot-dash line in FIG. 1 and conduit a and conduit c.

The fluid pressure from the rear master cylinder 20 is supplied to the rear wheel cylinder 22 through conduit d and conduit f, through the electro-magnetic changeover valve apparatus V as shown by the dot-dash line. It consists of a front electro-magnetic changeover valve apparatus portion Va and a rear electro-magnetic changeover valve apparatus portion Vb. The front electro-magnetic changeover valve apparatus portion Va consists of an inlet valve 13 and an outlet valve 14. On the other hand, the rear electro-magnetic changeover valve apparatus portion Vb consists of an inlet valve 23, an outlet valve 24 and a first interlocking (associated) electro-magnetic changeover valve 26, and a second interlocking (associated) electro-magnetic changeover valve 27. Although not shown, a front wheel is arranged between the front wheel cylinders 12a and 12b.

In the front electro-magnetic changeover valve apparatus portion Va, a conduit b divided from the conduit a is connected to the front master cylinder 10 and to an input port of the inlet valve 13. The outlet port thereof is connected to the input port of the output valve 14 and to the two front wheel cylinders 12a and 12b. An outlet port of the outlet valve 14 is connected to a front hydraulic reservoir 15. On the other hand, in the rear electro-magnetic changeover valve apparatus portion Vb, the conduit d from the rear master cylinder 20 is connected to an input port of the first interlocking (associated) electro-magnetic changeover valve 26. An outlet port of the first interlocking electro-magnetic changeover valve 26 is connected to the inlet port of the inlet valve 23 through a conduit e. The outlet port thereof is connected to an inlet port of the outlet valve 24. The outlet port thereof is connected to a rear hydraulic reservoir 25. The front hydraulic reservoir 15 and the rear hydraulic reservoir 25 are connected through check valves 32a, 33a and 33b, to the suction side of a hydraulic pressure pump 30. The outlet (discharging) side of the hydraulic pressure pump 30 is connected to the front master cylinder 10 side and the outlet side of the first interlocking electro-magnetic changeover valve 26 through check valves 32b and 33c. An inlet port of the second interlocking electro-magnetic changeover valve 27 is connected to the conduit d. The outlet side thereof is connected to the suction side of the hydraulic pressure pump 30 through a conduit g. The outlet side thereof is connected to a combined point of the check valves 33*a* and 33*b* connected to the suction side of the hydraulic pressure pump 30.

The inlet valves 13 and 23 and the outlet valves 14 and 24 are two-port, two-position electro-magnetic valves as is well known. With the nergization of the solenoids S, they are changed over into the communicating state or cutoff state. The first interlocking electro-magnetic changeover valve 26 takes the communicating state normally. When the solenoid S thereof is energized, it takes the relief valve state. The opening pressure of the relief valve is sufficiently high. The second interlocking electro-magnetic changeover valve 27 normally takes the cutoff state. When the solenoid S thereof is energized, it takes the communicating state. The electromagnetic changeover valves 13, 14, 23, 24, and 27 take a throttled communicating state. The letters g represent check valves.

The construction of this embodiment of the invention has been described. Next, operations of this embodiment will be described.

First, it is assumed that the hand lever 11 of the front master cylinder 10 is actuated, and that the pedal 21 of the rear master cylinder 20 is actuated. The pressure fluid from the front master cylinder 10 is supplied to the front wheel cylinders 12*a* and 12*b* through the conduit a and the inlet valve 13 under the condition as shown in the electromagnetic changeover valve apparatus V to the front wheel cylinders 12*a* and 12*b*. The pressure fluid from the rear master cylinder 20 is supplied through the conduit d, the first interlocking electro-magnetic changeover valve 26 and the inlet valve 23 under the condition as shown in the electromagnetic changeover valve apparatus V, and the conduit f to the rear wheel cylinder 22. Thus, both the front wheel and the rear wheel are braked.

Next, there will be described the case that only the hand lever 11 of the front master cylinder 10 is actuated, although the pedal 21 of the rear master cylinder 20 is not depressed. The brake fluid from the front master cylinder 10 is supplied through the conduit a, the inlet valve 13 and the conduit c to the front wheel cylinders 12*a* and 12*b*. Thus, the front wheel is braked. The brake switch BLS (not shown) provided at the front master cylinder 10 is turned on, and the fluid pressure sensor (not shown) generates a detecting signal to detect pressure in the conduit b. Accordingly, the solenoids S of the first interlocking electro-magnetic changeover valve 26 and of the second interlocking electro-magnetic changeover valve 27 are energized. The first interlocking electromagnetic changeover valve 26 is changed over into the cutoff state. The first interlocking electro-magnetic changeover valve 26 functions as relief valve in the cutoff state. However, the opening pressure is very high. Accordingly, this state is called as "cutoff state". The second interlocking electro-magnetic changeover valve 27 is changed over into the communicating state and the hydraulic pressure pump 30 starts to drive.

The brake fluid is sucked from the rear master cylinder 20 and supplied to the connecting point between the check valves 33*a* and 33*b* through the conduit d, the second interlocking electro-magnetic changeover valve 27 and the conduit g. The check valves 33*b* and 33*c* are opened. The pressure fluid from the hydraulic pressure pump 30 is flowed through the conduit e, inlet valve 23 and the conduit f to the rear wheel cylinder 22. Thus, also the rear wheel is braked. Thus, the rear wheel cylinder 22 is interlocked or associated with the braking operation of the front master cylinder 10. During such braking operation, the depression stroke of the pedal 21 becomes somewhat small, when the rear master cylinder 20 is actually or voluntarily operated because some brake fluid has already flowed out from the rear master cylinder 20. However, the driver wears footgear, and therefore feels slight or dull depression for pedal 21, in contrast to the hand operation. Accordingly, some stroke variation of the pedal 21 is no problem for the senses.

It is preferable that the interlocked brake fluid pressure for the rear wheel is varied in accordance with the fluid pressure of the front master cylinder 10 or the fluid pressure of the front wheel cylinders. For example, when the driver applies a little brake, the interlocked brake fluid pressure is made accordingly low. For example, the opening time of the second interlocking electro-magnetic changeover valve 27 is so adjusted as to control the interlocked fluid pressure.

In this embodiment, the operation of the hand lever 11 is detected with the brake switch BLS (not shown) and the fluid pressure sensor (not shown). Slipping of the front wheel may be detected instead of the fluid pressure sensor. It is confirmed by the brake switch BLS that the driver actuated the brake hand lever 11. By addition of the detector for the fluid pressure or wheel slippage, it is more surely confirmed that the driver has applied the brakes to the front wheel.

Next, there will be described the case that only the rear master cylinder 20 is operated without operation of the front master cylinder 10.

With the depression of pedal 21, the brake fluid from the rear master cylinder 20 is supplied to the rear wheel cylinder 22 through the conduit d, first interlocking electro-magnetic changeover valve 26, the conduit e, the inlet valve 23 and the conduit f. The rear wheel is braked. No valves corresponding to the first interlocking electro-magnetic changeover valve 26 and second interlocking electro-magnetic changeover valve 27 at the rear wheel side are provided at the front wheel side. Accordingly, no interlocking (associated) brake is applied to the front wheel. Thus, no fluid is discharged from the front master cylinder 10. Accordingly, the driver can apply a desired brake force to the front wheel with good feeling or sensation to the operating hand. Hand feeling is always good.

Although not shown, wheel speed sensors are associated with the front wheel and rear wheel, respectively. A control unit (not shown) receives output signals from the wheel speed sensors. It judges whether the brakes should be relieved, held or increased. In accordance with the judgment of the control unit, the solenoids S of inlet valve 13, outlet valve 14, first interlocking electro-magnetic changeover valve 26, second interlocking electro-magnetic changeover valve 27, inlet valve 23 and outlet valve 24 are energized or deenergized.

Thus, the fluid pressures applied to the front wheel cylinder 12 and/or rear wheel cylinder 22 can be held, lowered or increased, for the well-known purpose of antiskid control.

Further, according to the embodiment of this invention, when the control unit judges that the rear wheel drive[-]slips, the solenoids S of the first interlocking electro-magnetic changeover valve 28 and second interlocking electro-magnetic changeover valve 27 are energized and the hydraulic pressure pump 30 is driven to suck brake fluid from the rear master cylinder 20. The pressurized fluid from the hydraulic pressure pump 30 is supplied through the conduit e, and the inlet valve 23 to the rear wheel cylinder 22. The drive-slip of the rear wheel becomes smaller or optimized. The inlet valve 23 and outlet valve 24 are energized and deenergized to optimize the drive-slip of the rear wheel. Thus, the traction control is effected. As is well-known, the rear wheel is a drive wheel in the motorcycle.

Further, according to the embodiment of this invention, an electronic brake force distribution is effected between the front wheel and the rear wheel. The distribution rate of the rear wheel to the front wheel is changed in accordance with the vehicle decelerations $g_1, g_2, g_3 \ldots$, as shown FIG. 3. The fluid pressure of the rear wheel cylinder is controlled with the energization and/or the deenergization, of the solenoids S of the inlet valve 23, outlet valve 24, first interlocking electro-magnetic changeover valve 26 and second interlocking electro-magnetic changeover valve 27, in similar manner to the anti-skid control and the drive-slip (traction) control. The brake force of the rear wheel is equally changed with that of the front wheel below the vehicle deceleration $g_3$, namely at the gradient of 45 degree. Over the deceleration of $g_3$, the distribution rate of the rear brake force to the front brake force is decreased with the deceleration of $g_4$, $g_5$, $g_6$ . . . . In the end, the brake force of the rear wheel becomes zero. When the solenoid S of the inlet valve 23 for inlet or supply is energized, the brake force of the rear wheel is held. When both of the solenoids S of the inlet valve 23 and outlet valve 24 are energized, the braking force of the rear wheel is decreased. The brake forces between the front and rear wheels are distributed in accordance with a pattern memorized in an electronic braking force distribution controller. The brake force of the rear wheel is increased and decreased in the pattern shown in FIG. 3.

Figure 2:
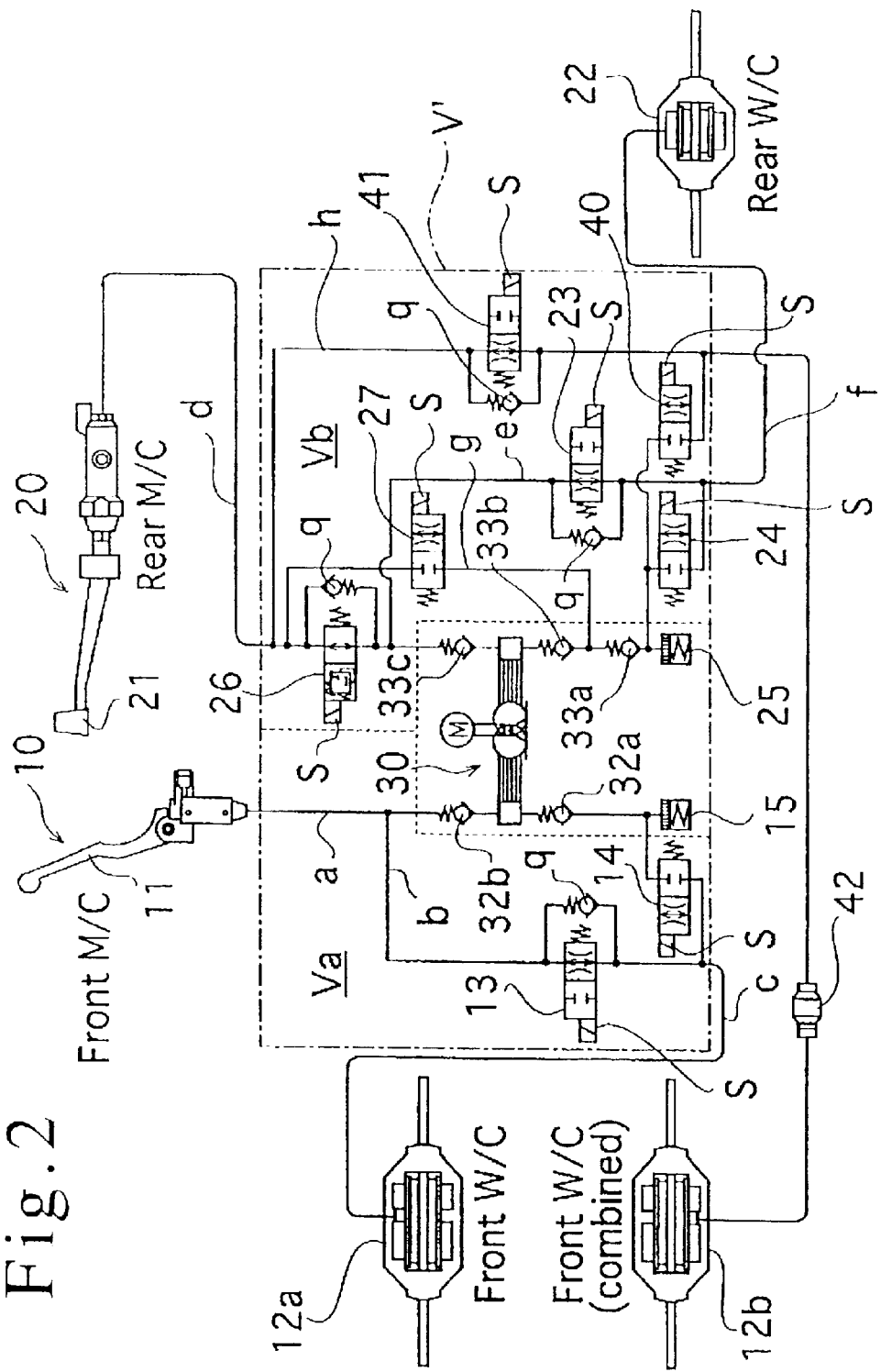
FIG. 2 is a schematic diagram which shows a conduit system of a break fluid pressure control apparatus for a motorbicycle according to a second embodiment of the invention.
Figure 3:
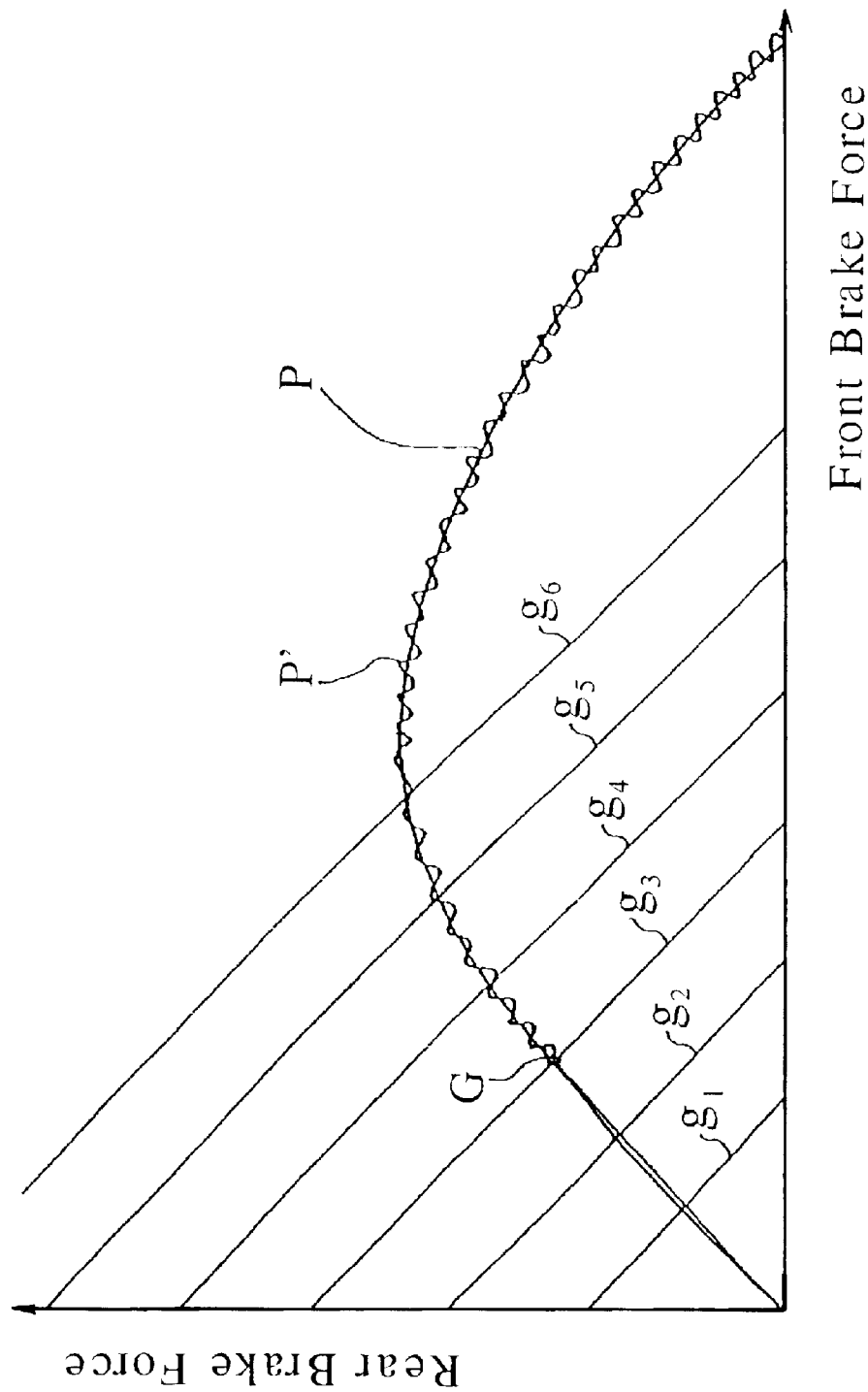
FIG. 3 is a graph explaining electronic distribution control between the rear brake force and the front brake force.

FIG. 2 shows a second embodiment of this invention. The parts in FIG. 2 which correspond to the parts in FIG. 1, are denoted by the same reference numerals, and the description thereof will be omitted.

A conduit h is provided in an electro-magnetic changeover valve apparatus V', derived from the conduit d connected to the rear master cylinder 20. A two-port, two-position electro-magnetic inlet valve 41 is arranged in the conduit h. An outlet side of the inlet valve 41 is connected to the front wheel cylinder 12b through a delay valve 42. Further, a two-port, two-position electro-magnetic outlet valve 40 is newly provided for passing brake fluid discharged from the front wheel cylinder 12b. It is connected to the rear hydraulic reservoir 25. A third electro-magnetic changeover valve apparatus portion is constituted by the two-port, two-position electro-magnetic inlet valve 41 and the two-port, two-position outlet valve 40.

There has been described construction of the second embodiment of this invention. Next, operations of this embodiment will be described.

In this embodiment, when the front master cylinder 10 and the rear master cylinder 20 are operated at the same time, the pressure fluid is supplied to the one front wheel cylinder 12a from the front master cylinder 10, and the pressure fluid is supplied to the other front wheel cylinder 12b from the rear master cylinder 20 through the conduits d, h, the electro-magnetic changeover valve 41 and the delay valve 42. The front wheel cylinder 12b is for interlocking or association to the rear master cylinder 20. When the motorcycle runs onto a narrow bridge or narrow road, the driver sometimes applies a little brake to the rear wheel for stabilizing the vehicle posture, because the front brake is so designed to be larger than the rear brake force. This is the reason why the delay valve 42 is provided between the rear master cylinder 20 and the front wheel cylinder 12b.

Also in this embodiment, the driver can actuate the brake hand lever 11 for operating the front master cylinder 10, with good feeling to the hand. Further, the hand lever stroke is stable.

Further in this embodiment, the anti-skid control of the front wheel is effected by the controls of the inlet valve 13, the outlet valve 14, and further the newly provided inlet valve 41 and outlet valve 40. The interlocking control and the drive-slip (traction) control are similar to those of the first embodiment.

Figure 4:
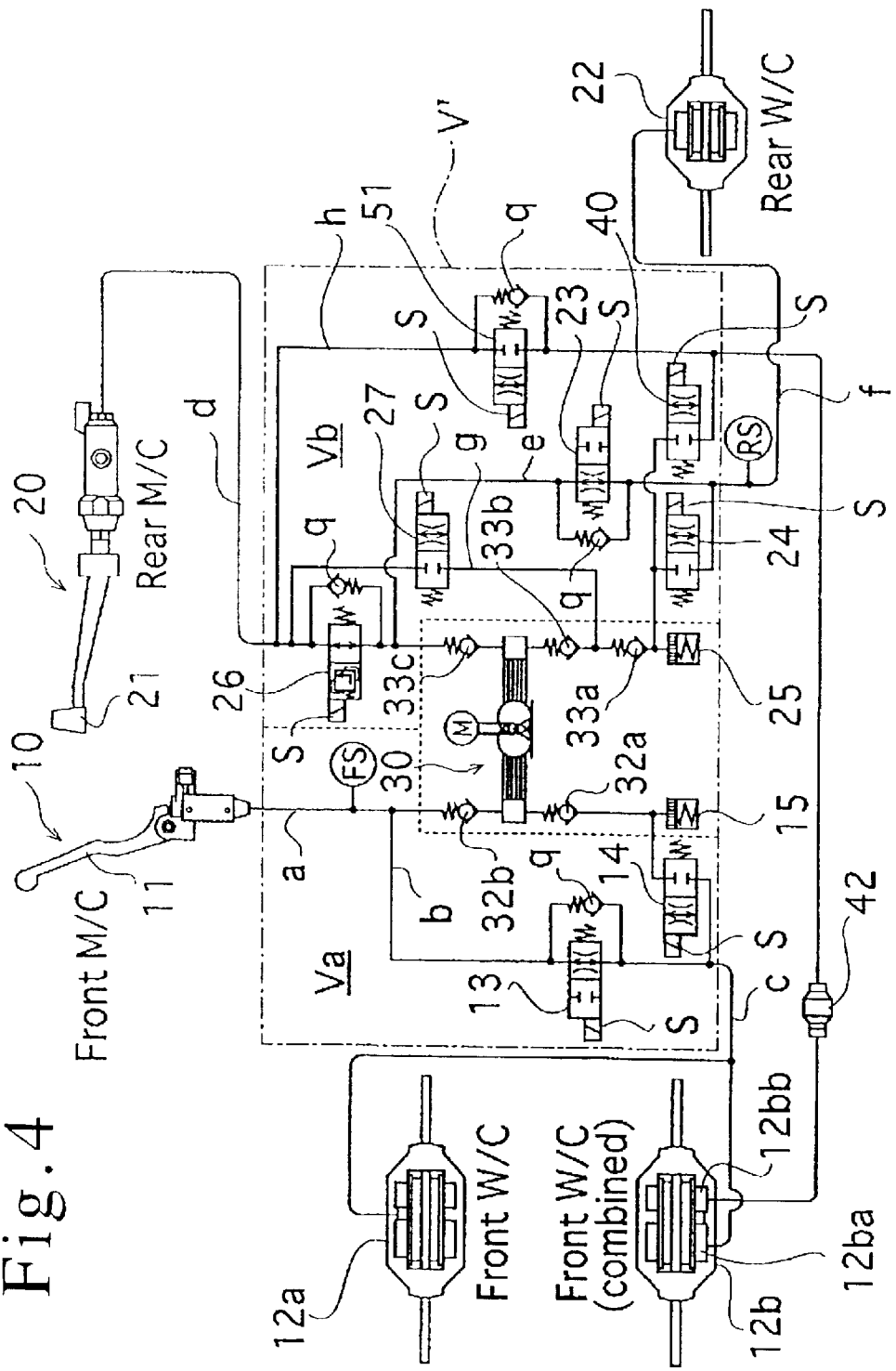
FIG. 4 is a schematic diagram which shows a conduit system of a break fluid pressure control apparatus for a motorbicycle according to a third embodiment of the invention.

FIG. 4 shows a third embodiment of this invention. Parts in FIG. 4 which correspond to those in the second embodiment, are denoted by the same reference numerals, the description of which will be omitted.

A cutoff valve 51 is provided instead of the inlet valve 41 in FIG. 2. It is put normally in the cutoff state, and it is changed over into the communicating state with the energization of the solenoid S. Further, it is connected to a smaller port 12bb of the front wheel cylinder 12b through the delay valve 42. Its larger port 12ba is connected to the conduit c which is, in turn, connected to the front master cylinder 10 side.

In this embodiment, a fluid pressure sensor FS is connected to the conduit portion between the outlet of the hydraulic pressure pump 30 and the front master cylinder 10. Another fluid pressure sensor RS is connected to the conduit portion between the rear wheel cylinder 22 and the outlet of the inlet valve 23. The fluid pressure generated in the front master cylinder 10 is measured by the fluid sensor FS. The fluid pressure applied to the rear wheel cylinder 22 is measured by the fluid pressure sensor RS.

When the rear master cylinder 20 is actuated, the pressure fluid is supplied to the rear wheel cylinder 22 through the inlet valve 23. The other fluid pressure sensor RS detects the fluid pressure applied to the rear wheel cylinder 22. The solenoid portion S of the electro-magnetic changeover valve 51 is energized with the detecting signal of the fluid pressure sensor RS. It is changed over into the communicating state. The fluid pressure of the rear master cylinder 20 is applied to the smaller port 12bb of the front wheel cylinder 12b. Thus, although the front master cylinder 10 is not operated, the brake fluid pressure is applied to the front wheel cylinder 12b.

The operation of the rear master cylinder 20 may be detected by a BLS switch (not shown) arranged at the rear master cylinder 20, so as to energize the solenoid portion S of the electro-magnetic changeover valve 51.

In this embodiment, all of the electro-magnetic changeover valves or valve apparatus are cut off from the electric power source when system troubles occur, such as, for example, damages to any one of the wheel speed sensors (not shown), the coil braking of the electro-magnetic changeover valve apparatus V, and the lowering of the power source voltage. The control unit (not shown) senses such troubles. Thus, the anti-skid control and the drive-slip (traction) control are stopped.

In the second embodiment, the inlet valve 41 is put normally in the communicating state. Thus, when the solenoid portion S thereof is not energized, the inlet valve 41 is put in the communicating state. Even when both of the front wheel and the rear wheel are desired to be braked independently of each other, the brake fluid is supplied to the front wheel cylinder 12b from the rear master cylinder 20. When the anti-skid control is effected, the front wheel might lock, because the brake fluid might be excessively supplied to the front wheel cylinder 12. However, in the third embodiment, the electro-magnetic changeover valve 51 is normally put in the cutoff state, namely in the deenergized state. Thus, the front wheel can be braked independently of the rear wheel. The front wheel is not locked, although the anti-skid control is not effected.

As above described, in the third embodiment, the fluid pressure sensors FS and RS are arranged whereby the output of the rear side fluid pressure sensor RS can be so controlled as to be proportional to the output of the front side fluid pressure FR. For example, the solenoid portions S of the first interlocking electro-magnetic changeover valve 26 and second interlocking electro-magnetic changeover valve 27 are turned on and turned off at predetermined intervals for such control, or the power supply to the electric motor M of the hydraulic pressure pump 30 is turned on and turned off at predetermined intervals for such a control. Thus, the amount of the brake fluid sucked from the rear master cylinder 20 is so controlled as to be proportional to the fluid pressure applied to the front wheel, at a predetermined rate. Of course, the solenoid portions S of the first interlocking electro-magnetic changeover valve 26 and second interlocking electro-magnetic changeover valve 27 may be ON-OFF controlled in accordance with the output of the fluid pressure sensor FS.

While the preferred embodiments have been described, possible variations thereto will occur to those skilled in the art within the scope of the present inventive concepts which are delineated by the following claims.

For example, in the above embodiments, the first electro-magnetic changeover valve apparatus portion Va connected to the front master cylinder 10 consists of the inlet valve 13 and the outlet valve 14. Instead, a three-port, three-position electro-magnetic valve may be used as the first electro-magnetic changeover valve apparatus portion Va. The brake force can be increased, held and decreased by the one three-port, three-position electro-magnetic changeover valve. The solenoid thereof is energized with high, middle or low level voltage, for decrease, holding or increase. Also the second rear electro-magnetic changeover valve apparatus portion Vb connected to the rear master cylinder 20 may be one three-port, three-position electro-magnetic changeover valve instead of the inlet valve 23 and outlet valve 24.

Further, the wheel cylinder is not limited to the shown wheel cylinder. For example, the front wheel cylinder provided with three input ports disclosed in the Japanese Patent Opening Gazette No. 71962/2000, may be used instead of the shown wheel cylinder. In that case, the front master cylinder 10 is connected through respective brake conduits to the three input ports. When it is used in the above second embodiment, one of the three input ports is used for the interlocking to the rear master cylinder, and the remaining two of them are connected directly to the front master cylinder 10.

Further, in the third embodiment, the front master cylinder 10 is connected both to the upper front wheel cylinder 12a and to the lower front wheel cylinder 12b in FIG. 4. Similar to the second embodiment, the front master cylinder 10 may be connected only to the upper front wheel cylinder 12a.

Further, in the embodiment of FIG. 4, a fluid pressure sensor may be added in the conduit portion between the rear master cylinder 20 and the second interlocking, electro-magnetic changeover valve 27 for interlocking. When the rear master cylinder 20 is operated during the time when only the front master cylinder 10 is operated and the rear wheel is interlockingly braked, or the first interlocking electro-magnetic changeover valve 26 is changed over into the cutoff state, and the second interlocking electro-magnetic changeover valve 27 is changed over into the communicating state, the fluid pressure between the rear master cylinder 20 and the second interlocking electro-magnetic changeover valve 27 (by the output of the added fluid pressure sensor) is compared with the fluid pressure between the second electro-magnetic changeover valve apparatus portion Vb (the changeover valves 23 and 24) and the rear wheel cylinder 22 (by the output of the fluid pressure sensor RS). When they become equal to one another, or come near each other, the first interlocking electro-magnetic changeover valve 26 and the second interlocking electro-magnetic changeover valve 27 are changed over into the normal state. Thus, the operation of the rear master cylinder 20 becomes smoother.

Further, in the first embodiment of FIG. 1, the pair of front wheel cylinders 12a and 12b are used as the front wheel cylinder means. Instead, one front wheel cylinder may be used as the front wheel cylinder means.

Further in the above embodiments, the front hydraulic reservoir 15 and the rear hydraulic reservoir 25 are used as the hydraulic reservoir means. Instead, one hydraulic reservoir may be used as the hydraulic reservoir means.

Further, in the above embodiments, brake fluid may be prereserved in the hydraulic reservoirs or hydraulic reservoir means.

Further, in the embodiments of FIG. 2 and FIG. 4, the third electro-magnetic changeover valve apparatus consists of the inlet valve 41 (normally taking the communicating state) and the outlet valve 40, and the inlet valve 51 (normally taking the cutout state) and the outlet valve 40, respectively. Instead, one three-port, three-position electro-magnetic changeover valve may be used as the third electro-magnetic changeover valve apparatus.

What is claimed is:

1. In a brake control method for a motorcycle which includes a front master cylinder, front wheel cylinder means hydraulically connected to said front master cylinder, a rear master cylinder, a rear wheel cylinder hydraulically connected to said rear master cylinder and a hydraulic pressure pump which sucks the brake fluid from said rear master cylinder and supplies discharging pressure fluid to said rear wheel cylinder, the improvement comprising: supplying brake pressure fluid only to said front wheel cylinder means from said front master cylinder and thereby driving said hydraulic pressure pump to supply discharging pressure fluid to said rear wheel cylinder when only said front master cylinder is operated, and supplying brake pressure fluid only to said rear wheel cylinder from said rear master cylinder and discharging no brake fluid from said front master cylinder when only said rear master cylinder is operated.

2. A brake control method for a motorcycle according to claim 1, in which brake fluid pressure of at least one of said front wheel cylinder and said rear wheel cylinder is adjusted for anti-skid control with electro-magnetic changeover valve means connected between said front master cylinder and said rear master cylinder, and also connected between said front wheel cylinder and said rear wheel cylinder.

3. A brake control method for a motorcycle according to claim 2, wherein upon activation of said hydraulic pressure pump, the brake fluid pressure of said rear wheel cylinder is adjusted for drive slip control by said electro-magnetic changeover valve means.

4. A brake control method for a motorcycle according to claim 1, in which said hydraulic pressure pump is driven upon detection of the operation of said front master cylinder.

5. In a brake control method for a motorcycle which includes a front master cylinder, one front wheel cylinder hydraulically connected to said front master cylinder, a rear master cylinder, a rear wheel cylinder hydraulically connected to said rear master cylinder, another front wheel cylinder hydraulically connected to said rear master cylinder and a hydraulic pressure pump which is connected for sucking the brake fluid from said rear master cylinder and supplying discharging pressure fluid to said rear wheel cylinder, the improvement comprising: supplying brake pressure fluid only to said one front wheel cylinder from said front master cylinder and thereby driving said hydraulic pressure pump to supply discharging pressure fluid to said rear wheel cylinder when only said front master cylinder is operated, and supplying break pressure fluid to said rear wheel cylinder and said other front wheel cylinder form said rear master cylinder and discharging no brake fluid from said front master cylinder when only said rear master cylinder is operated.

6. A brake control method for a motorcycle according to claim 5, in which brake fluid pressure of at least one of said front wheel cylinder and said rear wheel cylinder is adjusted for anti-skid control with electro-magnetic changeover valve means arranged between said front master cylinder and said rear master cylinder and also between said front wheel cylinder and said rear wheel cylinder.

7. A brake control method for a motorcycle according to claim 6, in which, with the actuation of said hydraulic pressure pump, the brake fluid pressure of said rear wheel cylinder is adjusted for drive slip control by said electro-magnetic changeover valve means.

8. A brake control method for a motorcycle according to claim 7, in which electric power supply to said electro-magnetic changeover valve means is stopped on the detection of system failure.

9. A brake control method for a motorcycle according to claim 5, in which said brake pressure fluid is supplied through a delay valve to said other front wheel cylinder.

10. A brake control method for a motorcycle according to claim 5, in which said hydraulic pressure pump is driven with detection of the actuation of said front master cylinder.

11. In a brake control apparatus for a motorcycle which includes:
  a first electro-magnetic changeover valve apparatus arranged between a front master cylinder, supplying brake fluid only to front wheel cylinder means, and said front wheel cylinder means;
  a second electro-magnetic changeover valve apparatus arranged between a rear master cylinder and a rear wheel cylinder;
  a hydraulic pressure pump which is connected for sucking the brake fluid from said rear master cylinder and is not connected to suck the brake fluid from said front master cylinder;
  a first association electro-magnetic changeover valve arranged between said rear master cylinder and said rear wheel cylinder, said first association electro-magnetic changeover valve having a normally communicating state; and
  a second association electro-magnetic changeover valve connected at one side between said rear master cylinder and said first association electro-magnetic changeover valve and connected at another side thereof to an inlet port side of said hydraulic pressure pump, said second association electro-magnetic changeover valve having a normally cutout state whereby when said front master cylinder is operated, said first association electro-magnetic changeover valve and second association electro-magnetic changeover valve are changed over from a communicating state to a cutout state and from a cutout state to a communicating state respectively, and said hydraulic pressure pump is driven to suck the brake fluid from said rear master cylinder through said second association electro-magnetic changeover valve and to supply discharging pressure fluid to said rear wheel cylinder.

12. In a brake control apparatus for a motorcycle which includes:
  a first electro-magnetic changeover valve apparatus arranged between a front master cylinder, supplying brake fluid only to a first front wheel cylinder and said first front wheel cylinder;
  a second electro-magnetic changeover valve apparatus arranged between a rear master cylinder and a rear wheel cylinder;
  a hydraulic pressure pump which is connected to suck the brake fluid from said rear master cylinder and does not suck the brake fluid from said front master cylinder;
  a third electro-magnetic changeover valve apparatus arranged between said rear master cylinder and a second front wheel cylinder different from said one front wheel cylinder, said third electro-magnetic changeover valve apparatus normally communicating said second front wheel cylinder with said rear master cylinder;
  a first association electro-magnetic changeover valve arranged between said rear master cylinder and said rear wheel cylinder, said first association electro-magnetic changeover valve having a normally communicating state; and
  a second association electro-magnetic changeover valve connected at one side between said rear master cylinder and said first association electro-magnetic changeover valve and connected at another side thereof to an inlet port side of said hydraulic pressure pump, said second association electro-magnetic changeover valve having a normally cutout state, whereby when said front master cylinder is operated, said first association electro-magnetic changeover valve and second association electro-magnetic changeover valve are changed over from a communicating state to a cutout state and from a cutout state to a communicating state respectively, and said hydraulic pressure pump is driven to suck the brake fluid from said rear master cylinder through said second association electro-magnetic changeover valve and to supply discharging pressure fluid to said rear wheel cylinder.

13. A brake control apparatus for a motorcycle according to claim 12, in which said third electro-magnetic changeover valve apparatus consists of an inlet valve and an outlet valve, said inlet valve and said outlet valve having a normally communicating state and a cutout state, respectively, and whereby with the energization of solenoid portions thereof, said inlet valve and outlet valve are changed over into a cutout state and a communicating state respectively, and said inlet valve is connected through a delay valve to said second wheel cylinder.

14. A brake control apparatus for a motorcycle according to claim 12, including detection means for detecting the operation of said front master cylinder whereby said hydraulic pressure pump is driven and said first association electro-magnetic changeover valve and said second association electro-magnetic changeover valve are changed over to supply brake fluid to said rear wheel cylinder with the detection of the operation of said front master cylinder.

15. A brake control apparatus for a motorcycle according to claim 12, in which said first electro-magnetic changeover valve apparatus and said second electro-magnetic changeover valve apparatus are arranged whereby brake fluid pressure of at least one of said front wheel cylinder and said rear wheel cylinder is adjusted for anti-skid control.

16. A brake control apparatus for a motorcycle according to claim 12, in which said first, second and third electro-magnetic changeover valve apparatus are arranged whereby brake fluid pressure of at least one of said front wheel cylinders and said rear wheel cylinder is adjusted for anti-skid control.

17. A brake control apparatus for a motorcycle according to claim 12, in which said second electro-magnetic changeover valve apparatus, said first association electro-magnetic changeover valve, and second association electro-magnetic changeover valve are arranged upon activation of said hydraulic pressure pump to adjustably control brake fluid pressure of said rear wheel cylinder for drive slip control.

18. In a brake control apparatus for a motorcycle which includes:
 a first electro-magnetic changeover valve apparatus arranged between a front master cylinder, supplying brake fluid only to front wheel cylinder means, and said front wheel cylinder means;
 a second electro-magnetic changeover valve apparatus arranged between a rear master cylinder and a rear wheel cylinder;
 a hydraulic pressure pump which is connected to suck the brake fluid from said rear master cylinder and does not suck the brake fluid from said front master cylinder;
 a third electro-magnetic changeover valve apparatus arranged between said rear master cylinder and said front wheel cylinder means, said third electro-magnetic changeover valve apparatus normally cutting off said front wheel cylinder means from said rear master cylinder;
 a first association electro-magnetic changeover valve arranged between said rear master cylinder and said rear wheel cylinder, said first association electro-magnetic changeover valve having a normally communicating state; and
 a second association electro-magnetic changeover valve connected at one side between said rear master cylinder and said first association electro-magnetic changeover valve and connected at another side thereof to an inlet port side of said hydraulic pressure pump, said second association electro-magnetic changeover valve having a normally cutout state whereby when said front master cylinder is operated, said first association electro-magnetic changeover valve and said association electro-magnetic changeover valve are changed over from a communicating state to a cutout state and from a cutout state to a communicating state respectively, and said hydraulic pressure pump is driven to suck the brake fluid from said rear master cylinder through said second association electro-magnetic changeover valve and to supply discharging pressure fluid to said rear wheel cylinder.

19. A brake control apparatus for a motorcycle according to claim 18, in which said third electro-magnetic changeover valve apparatus consists of an inlet valve and an outlet valve, said inlet valve and said outlet valve having normally cutoff states respectively whereby with the energization of solenoid portions thereof said inlet valve and outlet valve are changed over to communicating states respectively and said inlet valve is connected through a delay valve to said second wheel cylinder.

20. A brake control apparatus of a motorcycle according to claim 18, in which said third electro-magnetic changeover valve apparatus is arranged whereby it is changed over to communicate said rear master cylinder with one port of said front wheel cylinder means when said rear master cylinder is operated.

21. A brake control apparatus for a motorcycle according to claim 18, including anti-skid control means which anti-skid controls at least one of said front wheel cylinder means and said rear wheel cylinder means with said first, second and third electro-magnetic changeover valve apparatus.

22. A brake control apparatus for a motorcycle according to claim 18, including control means for the drive-slip control of a rear wheel with said second electro-magnetic changeover valve apparatus, said first association electro-magnetic changeover valve and said second association electro-magnetic changeover valve upon drive activation of said hydraulic pressure pump.

23. A brake control apparatus for a motorcycle according to claim 18, including means for electrically distributing braking control forces between said front wheel cylinder means and said rear wheel cylinder means.

24. A brake control apparatus for a motorcycle according to claim 18, arranged whereby power supply to said first, second and third electro-magnetic changeover valve apparatus and to said first association electro-magnetic changeover valve and second association electro-magnetic changeover valve is cut off on occurrence of a fault in the apparatus.

25. A brake control apparatus for a motorcycle according to claim 18, in which a first fluid pressure detector is arranged for detecting fluid pressure of said rear master cylinder, and a second fluid pressure detector is arranged for detecting fluid pressure of said rear wheel cylinder, whereby when said rear master cylinder is voluntarily actuated during a time when brake fluid is being sucked from said rear master cylinder with said hydraulic pressure pump, output of said first fluid pressure detector is compared with output of said second fluid pressure detector, and when the former output becomes equal to the latter output or almost equal to the latter output, the solenoid portions of said first and second association changeover valves are de-energized.

* * * * *